United States Patent
Barr et al.

(10) Patent No.: US 9,809,063 B2
(45) Date of Patent: Nov. 7, 2017

(54) LOW COMPACTION CANTILEVER TIRE

(71) Applicant: Bridgestone Americas Tire Operations, LLC, Nashville, TN (US)

(72) Inventors: Jason R. Barr, Akron, OH (US); Samuel O. Givens, Copley, OH (US); Robert W. Asper, Wadsworth, OH (US); Dennis W. Snyder, Uniontown, OH (US)

(73) Assignee: Bridgestone Americas Tire Operations, LLC, Nashville, TN (US)

( * ) Notice: Subject to any disclaimer, the term of this patent is extended or adjusted under 35 U.S.C. 154(b) by 0 days.

(21) Appl. No.: 14/613,540

(22) Filed: Feb. 4, 2015

(65) Prior Publication Data
US 2015/0231933 A1  Aug. 20, 2015

Related U.S. Application Data

(60) Provisional application No. 61/940,950, filed on Feb. 18, 2014.

(51) Int. Cl.
*B60C 3/00* (2006.01)
*B60C 13/00* (2006.01)
(Continued)

(52) U.S. Cl.
CPC ............. *B60C 13/00* (2013.01); *B60C 3/00* (2013.01); *B60C 9/02* (2013.01); *B60C 9/0292* (2013.01);
(Continued)

(58) Field of Classification Search
CPC ......... B60C 11/0311; B60C 2011/0313; B60C 13/003; B60C 13/004; B60C 15/024;
(Continued)

(56) References Cited

U.S. PATENT DOCUMENTS 2,037,640 A   4/1936  Macmillan
3,392,772 A   7/1968  Powers
(Continued)

FOREIGN PATENT DOCUMENTS

CN   103298628 A   9/2013
EP     0010533 A1   4/1980
(Continued)

OTHER PUBLICATIONS

John D. Kelley et al. "The 'LXX'—A New Concept in Tires", SAE Paper 690106, 8 pp. (undated but admitted to be prior art).
(Continued)

*Primary Examiner* — Robert Dye

(57) ABSTRACT

A low compaction cantilevered tire construction is provided which is designed for use at relatively low inflation pressures and which has sidewalls with a relatively uniform bending resistance through the majority of the sidewall. When the tire is placed under high loads at low inflation pressures the sidewall deflects substantially radially and allows the tread portion of the tire to maintain its intended shape thus improving the contact area of the tire and providing a tire having a relatively high contact area and thus relatively low soil compaction for a given loading.

11 Claims, 12 Drawing Sheets

(51) Int. Cl.
*B60C 11/03* (2006.01)
*B60C 9/02* (2006.01)

(52) U.S. Cl.
CPC ....... *B60C 11/0311* (2013.01); *B60C 11/0332* (2013.01); *B60C 13/003* (2013.01); *B60C 2013/005* (2013.01); *B60C 2200/08* (2013.01); *Y10T 152/10855* (2015.01)

(58) Field of Classification Search
CPC ..... B60C 2200/08; B60C 9/0292; B60C 3/00; B60C 3/04
USPC .................................................... 152/209.12
See application file for complete search history.

(56) References Cited

U.S. PATENT DOCUMENTS

| | | | |
|---|---|---|---|
| 3,486,547 A | 12/1969 | Powers | |
| 3,610,308 A | 10/1971 | McDonald | |
| 3,807,476 A | 4/1974 | Mills | |
| 3,920,061 A * | 11/1975 | Japp | B60C 17/10 152/504 |
| 3,930,527 A * | 1/1976 | French | B60B 21/02 152/158 |
| 3,949,798 A * | 4/1976 | Gardner | B60C 17/0009 152/454 |
| 4,051,884 A * | 10/1977 | Bourne | B60C 17/10 106/33 |
| 4,077,455 A * | 3/1978 | Curtiss, Jr. | B60B 21/10 152/454 |
| 5,253,689 A | 10/1993 | Sato et al. | |
| 5,337,814 A * | 8/1994 | Bonko | B60C 11/1369 152/209.12 |
| 5,411,067 A | 5/1995 | Beeghly et al. | |
| 5,464,050 A | 11/1995 | Bonko | |
| 5,837,073 A * | 11/1998 | Cauquot | B60B 21/104 152/454 |
| 6,044,884 A | 4/2000 | Peda | |
| 6,079,467 A * | 6/2000 | Ueyoko | B60C 15/06 152/539 |
| 6,358,346 B1 | 3/2002 | Beck, Jr. et al. | |
| 6,439,283 B1 | 8/2002 | Paonessa et al. | |
| 6,481,479 B1 | 11/2002 | Weed et al. | |
| 6,491,077 B1 | 12/2002 | Lopez et al. | |
| 6,536,493 B2 | 3/2003 | Beck, Jr. et al. | |
| 6,616,474 B2 | 9/2003 | Aiso | |
| 6,834,696 B1 | 12/2004 | Yurjevich et al. | |
| 7,093,633 B2 | 8/2006 | Dahlberg et al. | |
| 2013/0319588 A1 | 12/2013 | Uchiyama | |

FOREIGN PATENT DOCUMENTS

| | | |
|---|---|---|
| EP | 1017574 A1 | 7/2000 |
| WO | 9854014 A1 | 12/1998 |
| WO | 9910190 A1 | 3/1999 |

OTHER PUBLICATIONS

Firestone AG Tire Product Catalog, Dec. 1, 2013, 30 pp. (admitted to be prior art).
International Search Report and Written Opinion in corresponding International Application No. PCT/US2015/014361 dated May 11, 2015, 9 pp. (not prior art).
English abstract of CN103298628A.

* cited by examiner

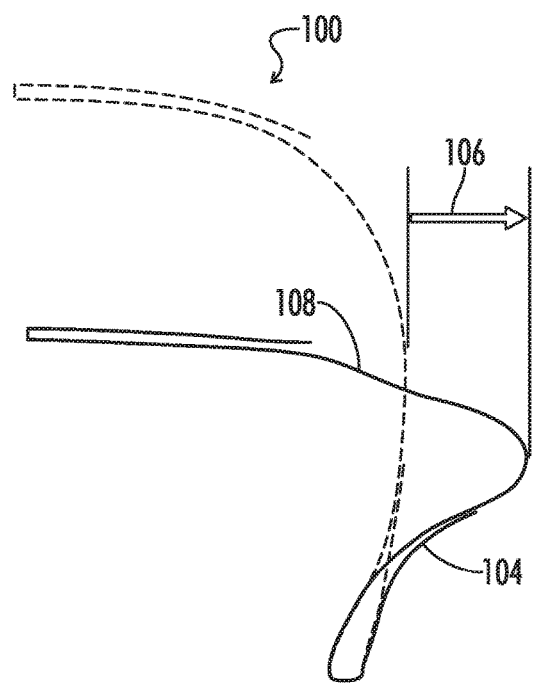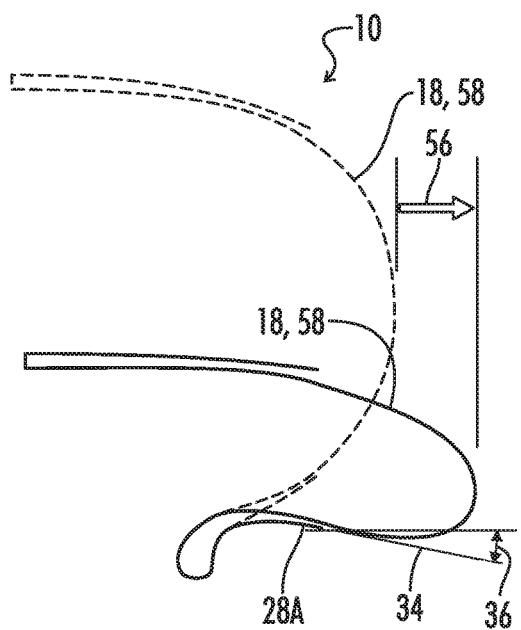
FIG. 4A
(PRIOR ART)
FIG. 4B

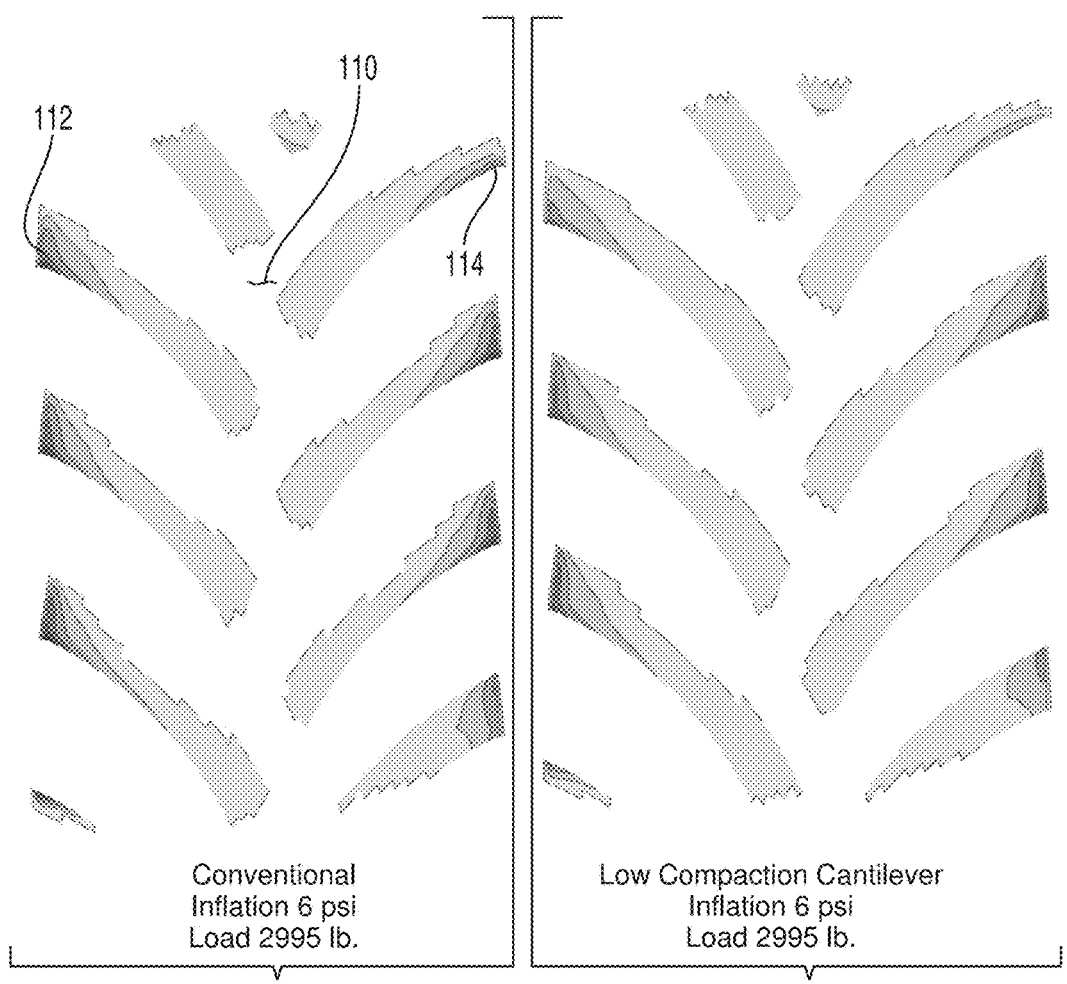
FIG. 9A — Conventional Inflation 6 psi Load 2995 lb.
FIG. 9B — Low Compaction Cantilever Inflation 6 psi Load 2995 lb.

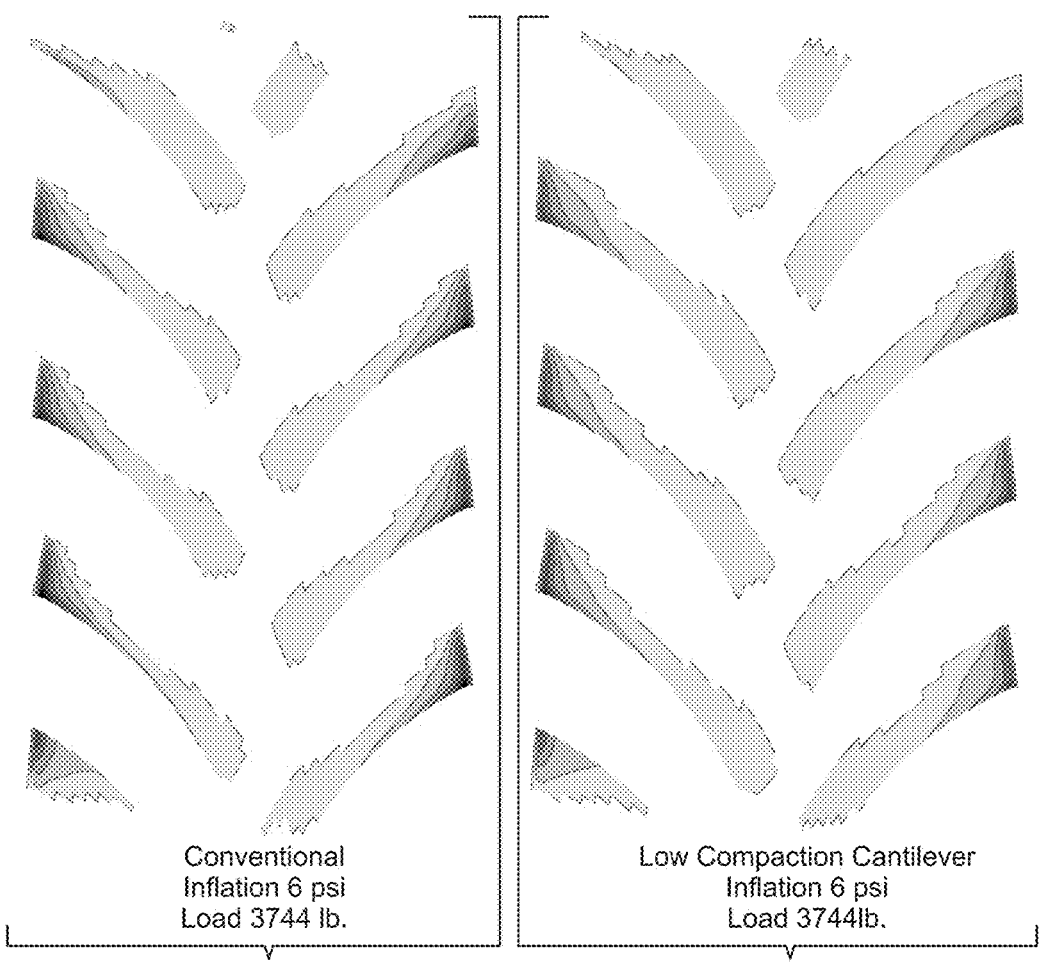
FIG. 10A  Conventional Inflation 6 psi Load 3744 lb.
FIG. 10B  Low Compaction Cantilever Inflation 6 psi Load 3744 lb.

LOW COMPACTION CANTILEVER TIRE

BACKGROUND OF THE INVENTION

1. Field of the Invention

The present invention relates to pneumatic tires, and more particularly to tires useful in situations where high contact area and high traction are desirable, such as in agricultural applications.

2. Description of the Prior Art

One issue confronting agricultural tires is the desire to reduce soil compaction. Compaction of soil adversely affects plant root growth and decreases crop yield. Soil compaction and damage to the ground can be mitigated by reducing contact pressure. Lower contact pressure can be achieved by increasing ground to tire contact area.

There is a continuing need for improvement in agricultural tires, and particularly tires which can carry the necessary loads while reducing the degree of soil compaction.

SUMMARY OF THE INVENTION

In one aspect a pneumatic tire includes a circumferential tread portion, a carcass including a pair of beads and one or more radial body plies extending between and wrapped around the beads, one or more belts disposed between the carcass and the circumferential tread portion, and a pair of sidewall portions extending from the beads to the tread portion. Each of the sidewall portions may include a lower cantilevered sidewall portion, at least an axially outer one-half of the lower cantilevered sidewall portion being free of any reinforcing layers other than the one or more radial body plies. The lower cantilevered sidewall portions may be configured such that when the tire is inflated to an inflation pressure within a manufacturer recommended pressure range for the tire and when the tire is loaded at maximum rated load for the inflation pressure, the lower cantilevered sidewall portion exhibits a radially inward axially outward slope.

In another aspect, a pneumatic tire may include a circumferential tread portion and a carcass including a pair of beads and one or more radial plies extending between and wrapped around the beads, with the body plies terminating in turn-up ends. The tire further may include one or more belts disposed between the carcass and the circumferential tread portion. The tire may have a section width and the tire may be configured to be mounted on a rim having rim flanges and having a rim width in a range of from 30% to 70% of the tire section width. The tire may include a pair of sidewall portions extending from the bead portions to the tread portion, each of the sidewall portions including a lower cantilevered sidewall portion, at least an axially outer one-half of the lower cantilevered sidewall portion being free of any reinforcing layer other than the body plies, and each of the sidewall portions having a substantially uniform bending resistance from a highest one of the turn-up ends in the lower cantilevered sidewall portion upward to at least 60% of a section height of the tire.

In any of the embodiments above, when the tire is in an unloaded condition, the lower cantilevered sidewall portions may exhibit a radially outward axially outward slope.

In any of the above embodiments the tire has a tire section width and the tire may be configured to be mounted on a rim having rim flanges and having a rim width in a range of from 30% to 70% of the tire section width.

In any of the above embodiments when the tire is inflated to an inflation pressure within a manufacture recommended pressure range, and when the tire is loaded at the maximum rated load for the inflation pressure, the carcass may maintain a positive curvature throughout an upper portion of each sidewall portion extending downward to 40% or less of a section height of the tire.

In any of the above embodiments, the body plies of the carcass may terminate in turn-up ends, and the carcass may maintain the positive curvature at least down to a highest one of the turn-up ends.

In any of the above embodiments each of the sidewall portions may be free of any reinforcing layers other than the one or more radial body plies from the axially outer one half of the lower cantilever sidewall portion up to at least 60% of a section height of the tire.

In any of the above embodiments each of the sidewall portions may be free of any reinforcing layers other than the one or more radial body plies from the axially outer one half of the lower cantilever sidewall portion up to at least 70% of a section height of the tire.

In any of the above embodiments, the body plies of the carcass terminate in turn-up ends, and the sidewall portions may have a substantially uniform bending resistance from a highest one of the turn-up ends upward to at least 60% of a section height of the tire, and more preferably upward to at least 70% of the section height of the tire.

In any of the above embodiments the tire may be an agricultural drive tire, and may include a circumferential tread comprising an agricultural tread including first and second rows of tread lugs extending from first and second shoulders of the tread portion toward an equatorial plane of the tire, the lugs extending at an angle of from 0° to 50° to a rotational axis of the tire, the tread having a ratio of contact area to total tread area of less than 50%.

In any of the above embodiments the tire may be a size 420/75R30, and may be rated for a load of at least about 5200 lb at a cold inflation pressure of 11 psi.

In any of the above embodiments the tire may be sized to fit on a rim having a nominal diameter of at least 20 inches.

In any of the above embodiments the tire may have a load rating in excess of a VF load rating in accordance with the standards of The Tire and Rim Association, and preferably the tire may have a load rating of at least about 160% of a Standard load rating in accordance with the standards of The Tire and Rim Association.

Numerous objects, features and advantages of the present invention will be readily apparent to those skilled in the art upon a reading of the following disclosure when taken in conjunction with the accompanying drawings.

BRIEF DESCRIPTION OF THE DRAWINGS

FIG. 4A is a schematic illustration of the unloaded and loaded cross-sectional shapes of the carcass of the typical prior art tire that was shown in dashed lines in FIG. 2.

FIG. 4B is a schematic cross-section view comparing the unloaded and loaded shapes of the carcass of the tire of FIG. 1.

FIGS. 9A and 9B are a side by side comparison of the contact pressures for a prior art tire and an example tire of the present invention at a load of 2995 lbs.

FIGS. 10A and 10B are a side by side comparison of the contact pressures for a prior art tire and an example tire of the present invention at a load of 3744 lbs.

DETAILED DESCRIPTION OF THE INVENTION

Figure 1:
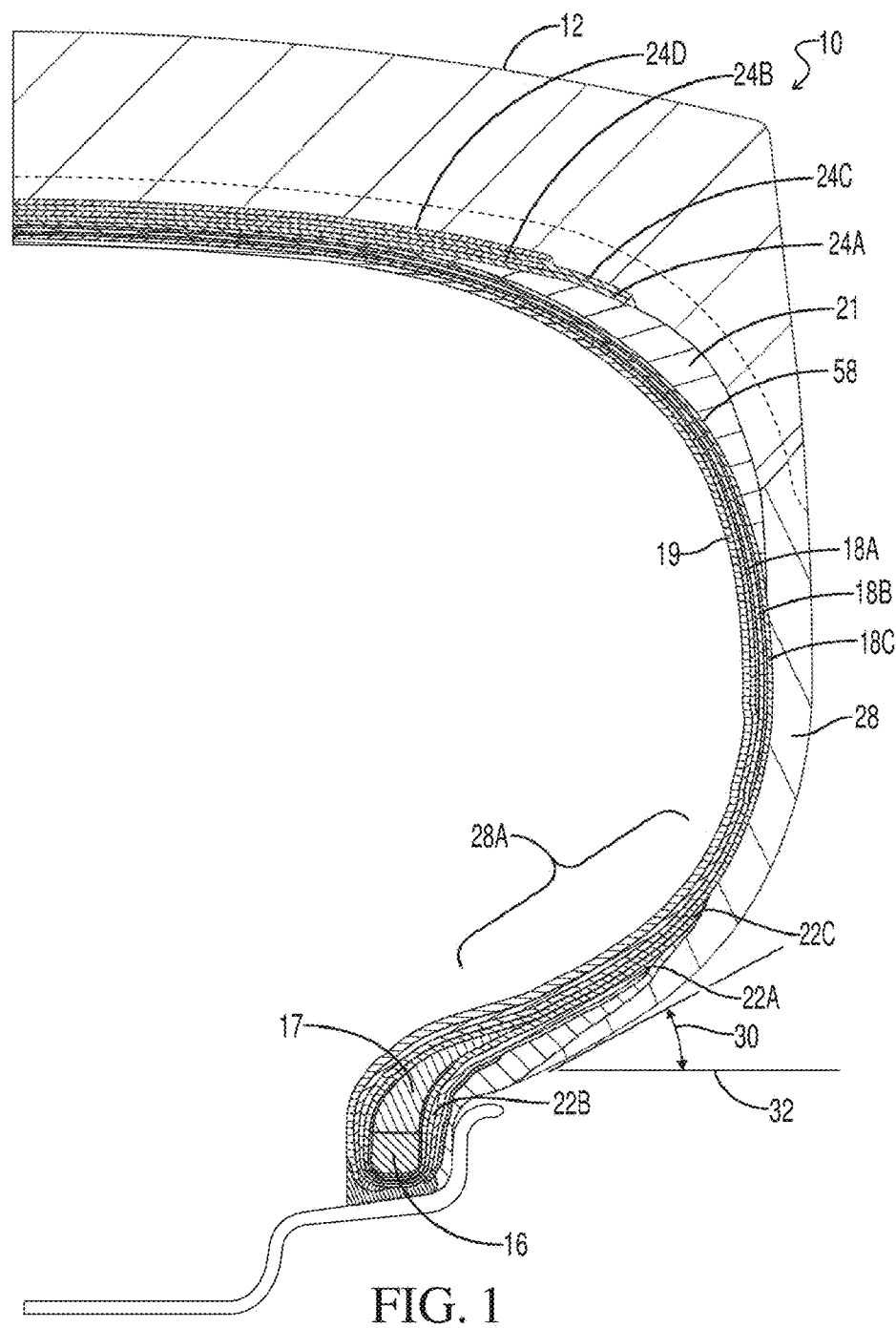
FIG. 1 is a cross-sectional view of the right side of a tire constructed in accordance with the present invention.

Following are definitions of selected terms employed herein. The definitions include various examples and/or forms of components that fall within the scope of a term and that may be used for implementation. The examples are not intended to be limiting. Both singular and plural forms of terms may be within the definitions.

"Aspect ratio" means the ratio of the tire's section height to its section width.

"Axial" and "axially" refer to directions which are parallel to the axis of rotation of a tire.

"Bead" or "bead core" refers to that part of a tire comprising an annular tensile member, the bead core, wrapped by ply cords and shaped, with or without other reinforcement elements to fit a designed tire rim.

"Belt" or "belt ply" refers to an annular layer or ply of parallel cords, woven or unwoven, underlying the tread, not anchored to the bead.

"Carcass" refers to the tire structure apart from the belt structure, tread, undertread, and sidewall rubber but including the beads, (carcass plies are wrapped around the beads).

"Circumferential" refers to lines or directions extending along the perimeter of the surface of the annular tread perpendicular to the axial direction.

"Cord" means one of the reinforcement strands of which the plies in the tire are comprised.

"Crown" refers to substantially the outer circumference of a tire where the tread is disposed.

"Equatorial plane (EP)" refers to a plane that is perpendicular to the axis of rotation of a tire and passes through the center of the tire's tread.

"Inner liner" means the layer or layers of elastomer or other material that form the inside surface of a tubeless tire and that contain the inflating fluid within the tire.

"Nominal rim diameter" means the average diameter of the rim flange at the location where the bead portion of the tire seats.

"Ply" means a continuous layer of rubber coated parallel cords.

"Radial" and "radially" refer to directions that are perpendicular to the axis of rotation of a tire.

"Radial-ply" or "radial-ply tire" refers to a belted or circumferentially-restricted pneumatic tire in which the ply cords which extend from bead to bead are laid at cord angles between 65 degree and 90 degree with respect to the equatorial plane of the tire.

"Section height" (SH) means the radial distance from the base of the bead core to the outer diameter of the tire at its equatorial plane.

"Section width" (SW) means the maximum linear distance parallel to the axis of the tire and between the exterior of its sidewalls when and after it has been inflated at normal inflation pressure for 24 hours, but unloaded, excluding elevations of the sidewalls due to labeling, decoration or protective bands.

"Turn-up height" (TH) means the radial distance from the base of the bead core to the upper end of the turn-up.

Directions are also stated in this application with reference to the axis of rotation of the tire. The terms "upward" and "upwardly" refer to a general direction towards the tread of the tire, whereas "downward" and "downwardly" refer to the general direction towards the axis of rotation of the tire. Thus, when relative directional terms such as "upper" and "lower" are used in connection with an element, the "upper" element is spaced closer to the tread than the "lower" element. Additionally, when relative directional terms such as "above" or "below" are used in connection with an element, an element that is "above" another element is closer to the tread than the other element. The terms "axially inward" and "axially inwardly" refer to a general direction towards the equatorial plane of the tire, whereas "axially outward" and "axially outwardly" refer to a general direction away from the equatorial plane of the tire and towards the sidewall of the tire.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995). Also, to the extent that the terms "in" or "into" are used in the specification or the claims, it is intended to additionally mean "on" or "onto." Furthermore, to the extent the term "connect" is used in the specification or claims, it is intended to mean not only "directly connected to," but also "indirectly connected to" such as connected through another component or multiple components.

The low compaction cantilevered tire of the present invention provides a large footprint under high deflection conditions. Compared to a conventional agricultural tire, the low compaction cantilevered tire design has a greater rim diameter and a narrower rim width. The construction preferably has radial cords in the body and a belted construction in the crown. This combination of shape and construction produces a relatively large long flat footprint under high deflection conditions. Conventional agricultural tires lose contact area under high deflection due to shape change in the upper sidewall. In contrast, the upper sidewall of the low compaction cantilevered tire maintains its shape under high deflection conditions. The design of the low compaction cantilevered tire allows the lower sidewall to deflect. This mechanism reduces the upper sidewall deflection and shape change. This allows the low compaction cantilevered tire to achieve a larger contact area and lower contact pressure than does a conventional agricultural tire construction.

Although the present disclosure is explained in the context of an agricultural tire application, the inventive concept has broader application, and is well suited for other situations where high contact area and high traction are key design objectives. For example, the tire construction shown in FIG. 1 could be used for free rolling tires, combine tires, grain cart tires, non-driven implement tires, off road tires and flotation tires.

Figure 2:
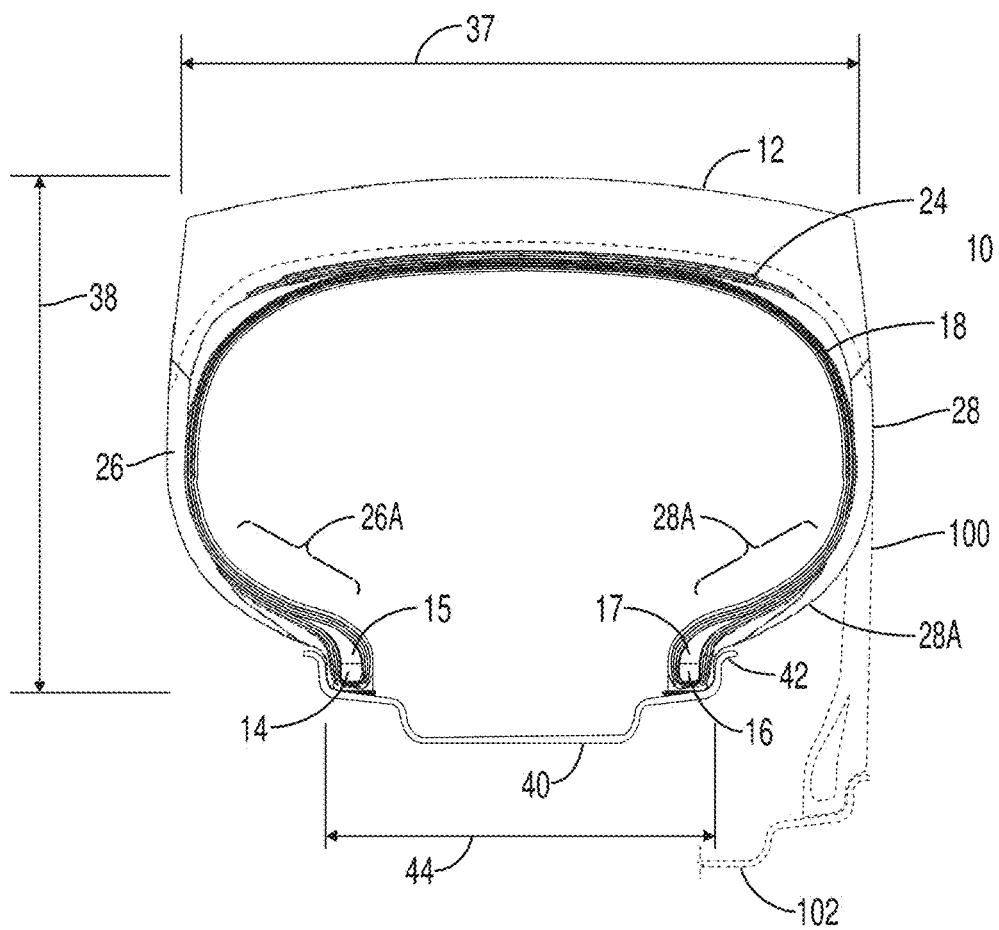
FIG. 2 is a schematic cross-section view of the tire of FIG. 1 shown mounted on a rim, and contrasted to the cross-section and rim of a typical prior art tire construction for which the present tire would be substituted.

Referring now to the drawings, and particularly to FIGS. 1 and 2, a pneumatic tire 10 includes a circumferential tread portion 12. A carcass 18 includes a pair of beads 14 and 16 and one or more radial body plies 18A, 18B and 18C extending between and wrapped around the beads 14 and 16 terminating in turn-up ends 20A-C and 22A-C. Bead fillers 15 and 17 are located above beads 14 and 16.

A belt package 24 which may be made up of one or more belts 24A-D is disposed between the carcass 18 and the circumferential tread portion 12.

A pair of sidewall portions 26 and 28 extend from the beads 14 and 16 to the tread portion 12. The sidewall portions 26 and 28 include first and second lower cantilevered wall portions 26A and 28A. The tire 10 has a section width 37 and a section height 38.

Inside of the body plies 18 is an inner liner 19. A wedge shaped stabilizer ply insert 21 has an upper tapered portion extending between the body plies 18 and the lower belt 24A, and a lower tapered portion extending between the body plies 18 and the upper part of the sidewall rubber. The stabilizer ply insert 21 is typically constructed of the same material as the sidewall rubber.

The concept of a cantilevered sidewall portion is best explained with reference to FIG. 2 which contrasts the cantilevered tire construction of the present invention 10 to a conventional prior art tire construction which is not cantilevered as indicated by the tire 100. For a typical non-cantilevered tire, the bead portions of the tire are designed and constructed and dimensioned such that they fit on a wheel rim 102 having a rim width very similar to the section width of the tire 100. A cantilevered tire construction, however, is dimensioned such that the tire 10 is configured to be mounted on a rim 40 having rim flanges 42 and having a rim width 44 in a range of from 30% to 70% of the section width 36. Thus the rim 40 utilized with the low compaction cantilevered tire design 10 will have a larger rim diameter and a narrower rim width than will the rim 102 used with the typical prior art tire 100 having a similar section width and overall outside diameter. Thus the cantilevered portions 26A and 28A of the sidewall portions 26 and 28 are those portions which extend generally axially outward past the rim width. It will be understood that the cantilevered portion will not generally be parallel to the rotational axis of the tire, but will be at some angle to the rotational axis of the tire. It will also be appreciated that there is no exact point where the cantilevered sidewall portion ends and the more traditional generally vertical upper sidewall portion begins, as the same will be in part dependent upon the loading of the tire.

The lower cantilevered sidewall portions of the tire 10 may be configured such that when the tire is inflated to manufacture recommended pressure and when the tire is in an unloaded condition, as generally shown in FIG. 1, the lower cantilevered sidewall portions exhibit a radially outward axially outward slope generally indicated by the angle 30 of a tangent to the outer surface of the sidewall portion relative to a line 32 parallel to a rotational axis of the tire.

In contrast, when the tire is inflated to manufacture recommended pressure and when the tire is loaded at maximum rated load as schematically illustrated in the solid line portion of FIG. 4B, the lower cantilevered wall portions may exhibit a radially inward axially outward slope 34 defining a negative angle 36 relative to a line parallel to a rotational axis of the tire.

Figures 5A, 5B:
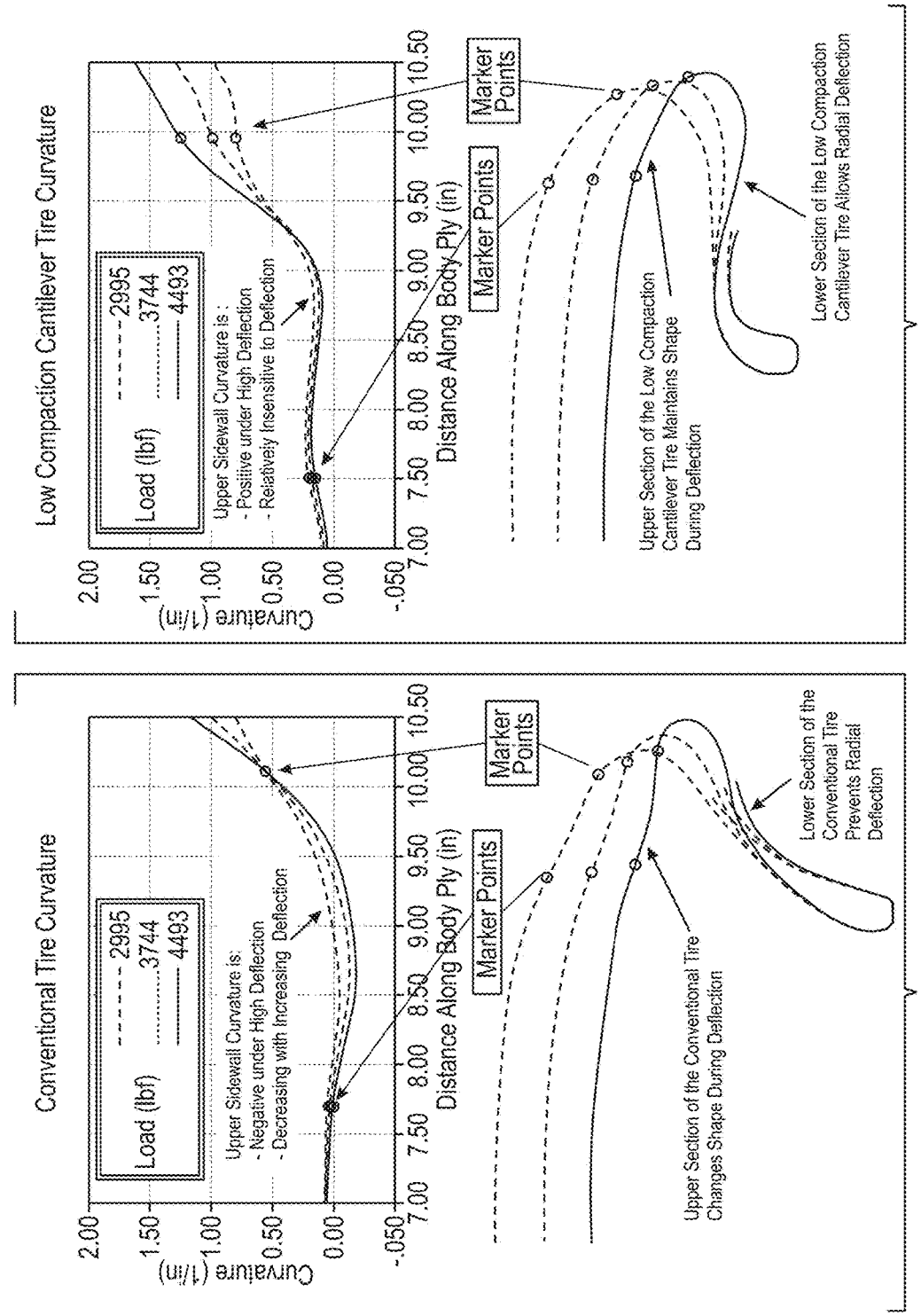
FIG. 5A is related to the information in FIG. 4A and shows both a graphical and a schematic profile of the curvature of the tire carcass of a conventional prior art tire as the same is loaded at various loadings.
FIG. 5B is related to the information depicted in FIG. 4B and in a manner similar to that of FIG. 5A shows both graphically and through a schematic illustration the changes in curvature of the carcass at various loadings of one example of the tire of the present invention.

As is further explained below, the lower sidewall portions 26A and 28A, and at least the axially outer one-half of the lower sidewall portions 26A and 28A, are preferably free of any reinforcing layers other than the body plies 18 so as to allow the lower sidewall portions to freely flex to deflect as schematically illustrated in FIGS. 4B and 5B. As used herein the term "reinforcing layers" is meant to refer to structural layers that add significant stiffness to the sidewall, including ply inserts of cord reinforced material, or hard rubber inserts (e.g. those having a Shore A hardness of 70 or greater). "Reinforcing layers" does not include layers of relatively soft rubber comparable in hardness to the sidewall rubber itself.

Figure 3:
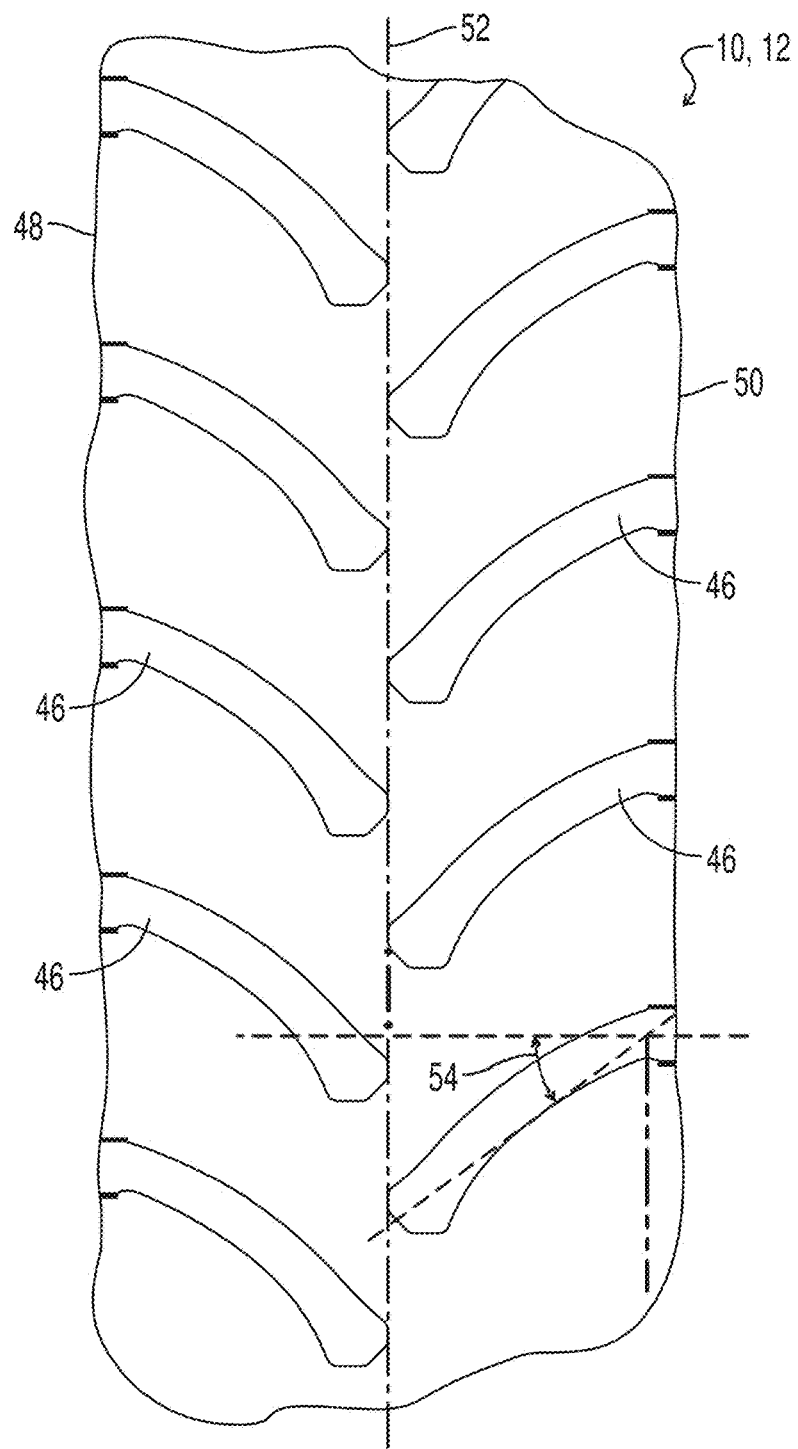
FIG. 3 is a laid out plan view of the tread portion of the tire of FIG. 1.

The particular example of low compaction cantilevered tire construction illustrated in FIG. 1 may be an agricultural tire, and particularly may be suitable as a front drive tire for a mechanical front wheel drive of a tractor. Such a tire may have a tread portion 12 as is further illustrated in FIG. 3 wherein the circumferential tread portion 12 comprises an agricultural tread including first and second rows of tread lugs 46 extending from the first and second shoulders 48 and 50 of the tread portion toward an equatorial plane 52 of the tire. The lugs 46 may extend at an angle 54 of from 0° to 50° to a rotational axis of the tire 10. A tread portion 12 such as illustrated in FIG. 3 will typically have a ratio of contact area to total tread area of less than 50%.

Turning now to FIGS. 4A and 4B, a comparison is thereshown of the deflection of the low compaction cantilevered tire 10 as shown in FIG. 4B as contrasted to the deflection of a typical prior art tire 100 as shown in FIG. 4A.

In each figure the respective tire is shown in its inflated unloaded position in the upper dashed line portion of the figure, and in its inflated fully loaded position in the lower solid line portion of the drawing. In FIGS. 4A and 4B, only the carcass member and belts of the tire are shown for ease of illustration.

The solid line lower portions of FIGS. 4A and 4B depict the deflected positions of the respective tires when the tire is inflated to manufacture recommended pressure and when the tire is located at a maximum rated load.

As seen in FIG. 4A, for the typical prior art tire, as the tire is loaded the lower sidewall portion deflects primarily in a lateral direction, that is it bends axially outward and has a high lateral deflection as indicated by the arrow 106. It is also noted that a carcass 108 within an upper sidewall portion of the prior art tire substantially changes shape during the deflection of the sidewall. As is further explained below with regard to FIG. 5A, this high deflection will cause an increase in pressure at the shoulders of the tread portion of the prior art tire, and the center portion of the footprint of the prior art tire will begin to lift off the ground at high loads.

In contrast, as shown in FIG. 4B, the lower sidewall portion 28A of the low compaction cantilevered tire 10 moves primarily in a radial direction during deflection. Also, the low compaction cantilevered tire has a relatively low lateral deflection as indicated by the arrow 56. This allows for the upper sidewall portion 58 of carcass 18 of the low compaction cantilevered tire 10 to maintain its intended shape, and as a result the center of the footprint of the low compaction cantilevered tire 10 has less of a tendency to lift off or raise up away from the ground surface than does the conventional tire 100.

FIGS. 5A and 5B provide additional information illustrating and explaining the comparative carcass deflections described with regard to FIGS. 4A and 4B. The tire cross-sections and footprints illustrated in FIGS. 5A and 5B are for a size 420/85R26 conventional tire construction 100 as contrasted to a size 420/75R30 low compaction cantilevered tire construction 10. The 420/75R30 tire has a section width of 17.2 inches and is designed for a rim width of 9.0 inches. By contrast, the prior art 420/85R26 tire has a section width of 16.5 inches and is designed for a rim width of 15 inches.

In FIG. 5A, an upper graph depicts the curvature of the tire carcass as a function of the position along the carcass from an equatorial plane of the tire. The curvature is the change in slope of the tire carcass. Thus a zero curvature indicates a point where the tire carcass defines a straight line, a positive curvature indicates a point where the slope is increasing, and a negative curvature indicates a point where the slope is decreasing.

With the prior art tire 100 as depicted in FIG. 5A, it is seen that at the point approximately 7.7 inches from the equatorial plane, there is an inflection point or point of zero curvature where the slope stops increasing and begins decreasing. This type of bending imposed upon the overall tire cross-section tends to cause portions of the footprint of the tire located toward the equatorial plane to begin to lift off of the ground surface or at least exhibit reduced contact pressures, as is further explained below with regard to FIGS. 8-11.

The tire 10 of the present invention, in contrast, as depicted in FIG. 5B exhibits a positive curvature throughout the upper portion of the sidewall of the tire under all the representative loading conditions.

In both FIGS. 5A and 5B, the cross-sectional profile of the tire carcass is schematically represented at three different loading conditions. In FIG. 5A, the dashed line corresponds to an IF loading condition of 2995 lb. The broken line represents a VF loading condition of 3744 lb. The solid line represents a New loading condition of 4493 lb.

The tire 10 of the present invention is preferably constructed such that the carcass 18 maintains this positive curvature throughout the upper portion 58 of each sidewall portion extending down to 40% or less of a section height of the tire. Preferably, the carcass 18 maintains the positive curvature at least down to a highest turn-up end 28C.

By avoiding the use of any reinforcing layers in the sidewall portions other than the body plies of the carcass, the sidewall portions will as a result have a substantially uniform bending resistance throughout most of the sidewall portion, thus allowing the sidewall portions to smoothly deflect primarily in a radial direction as depicted in FIGS. 4B and 5B. Preferably, the sidewall portions of the tire 10 will have a substantially uniform bending resistance at least from a highest turn-up end 22C upward to at least 60% and preferably to at least 70% of the section height of the tire. This can correspond to the sidewall portions being free of any reinforcing layers other than the body plies in those same portions of the sidewall up to at least 60% and preferably up to at least 70% of a section height of the tire.

It is noted that the turn-up ends 22A, 22B and 22C shown in the example of FIG. 1 are all located in the lower cantilevered portion of the sidewall. Those turned up portions of the body plies increase the bending resistance of those portions of the lower sidewall where the turned up portions of the body plies are located. There are tire designs, however, where a body ply extends under and around a bead and then back upwards through a majority or even the entirety of the sidewall. Although such a turned up portion would increase the bending resistance of the sidewall, it would not affect the uniformity of the bending resistance. It is uniformity of bending resistance which most affects the shape obtained by the sidewall when heavily loaded under low inflation pressures.

It is noted that the prior art has included cantilevered tire designs and those tires have most often been intended for use as run flat tires and have been designed to provide certain characteristics when the tire is flat and the tread portion or sidewall portion of the tire actually engages the rim of the tire. Those prior art cantilevered tire designs have typically had various stiffening layers added in the sidewalls to control the shape of the sidewall when the tire is flat. The tire 10 of the present invention, by contrast, utilizes a cantilevered tire construction which has a relatively uniform bending resistance throughout the sidewall to give a desired shape while the tire remains inflated at relatively low inflation pressures. The tire 10 of the present invention is not designed for use in a non-pneumatic mode as a run flat tire.

The permissible loadings for tires are typically determined by the standard set forth by The Tire and Rim Association, Inc., 175 Montrose West Avenue, Suite 150, Copley, OH 44321 (The Tire and Rim Association). The Tire and Rim Association is the standardizing body for the tire, rim, valve and allied parts industry for the United States. The Tire and Rim Association standards are published in The Tire and Rim Year Book and other supplemental publications available from The Tire and Rim Association.

It will be appreciated that a given tire design will have a higher permissible loading for higher inflation pressures, up to a maximum recommended inflation pressure as set by the manufacturer of the tire. The Tire and Rim Association has specified certain "Standard" load ratings for radial ply metric agricultural tractor drive tires. Additionally, The Tire and Rim Association has developed an "IF" load rating for what are sometimes referred to as "high deflection" tires, and an "VF" load rating for what are sometimes referred to as "very high deflection" tires.

The "IF" and "VF" load ratings are rating standards that have been previously developed for use on radial ply metric agricultural tractor drive wheel tires, and published as Table IF-1 and Table VF-1, as published for example in The Tire and Rim Year Book 2012. Those published tables are based upon a rating formula published by The Tire and Rim Association for the "IF" and "VF" ratings, which is found in the Engineering Design Information book published by The Tire and Rim Association. That rating formula is found at Page 5-53, Rev. 1, dated Oct. 22, 2010 of—the Engineering Design Information book published by The Tire and Rim Association, and will use as factor $K_1$ the special IF factor of 1.20 or the special VF factor of 1.40.

The low compaction cantilever tire design 10 of the present invention is intended to provide a tire construction capable of even more extreme deflection than the IF or VF ratings, and which for purposes of the present disclosure is referred to as a New rating. This New load rating proposes to use as factor K in the rating formula of The Tire and Rim Association the factor 1.60.

Figure 6:
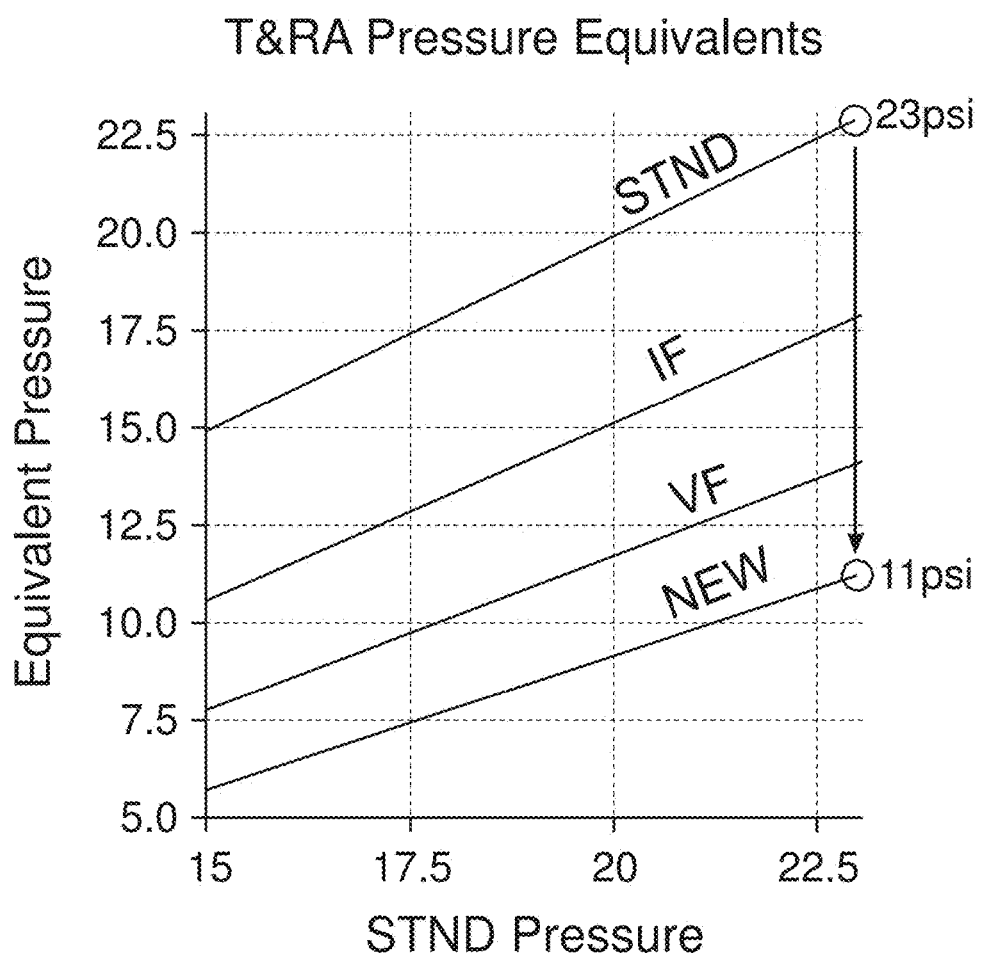
FIG. 6 is a graph depicting and comparing the reduced pressures which may be utilized in tires of the IF and VF ratings and of the tire of the present invention which is represented as a New rating, as contrasted to a Standard tire rating. The chart shows that reduced pressures can be utilized for comparable loadings when using tires of the IF, VF and New rating categories.

FIG. 6 is a graphical representation comparing the inflation pressures for the IF, VF and New load ratings as compared to a standard (STND) load rating, for a range of load limits. Although the specific load limits are not set forth on the horizontal axis of FIG. 6, it will be understood that the upward slope of the lines in the graph of FIG. 6 represents the increased load limits at the various cold inflation pressures indicated which range from about 6 psi to about 23 psi in the various curves of the graph of FIG. 6. Thus, for example, for the standard (STND) load rating shown in FIG. 6, the range of permissible inflation pressures can be interpreted as extending from 15 psi to 23 psi, with 23 psi being the maximum manufacturer recommended inflation pressure for a 420/85R26 tire of conventional design. The tire load limit at that maximum inflation pressure is 5200 lb. FIG. 6 indicates that for that same tire load limit of 5200 lb, an IF rated tire could carry that load at an inflation pressure of approximately 18 psi, a VF rated tire could carry that same load at an inflation pressure of approximately 14 psi, and a New rated tire could carry that same load at an inflation pressure of 11 psi.

Figure 7A:
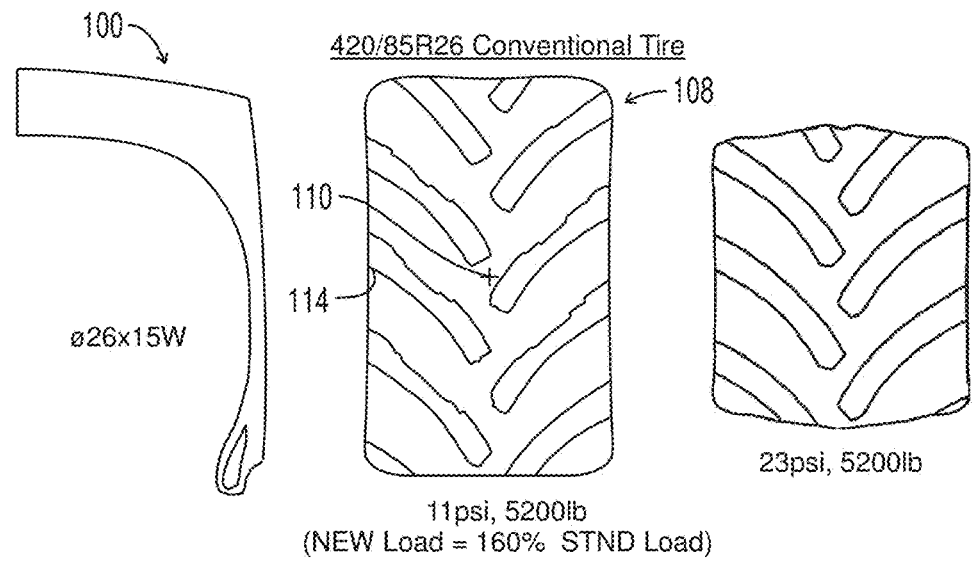
FIG. 7A shows a schematic cross-section view of the right hand side of a typical prior art tire and the corresponding footprint of the tire at maximum loading for inflation pressures of 11 psi and 23 psi.
Figure 7B:
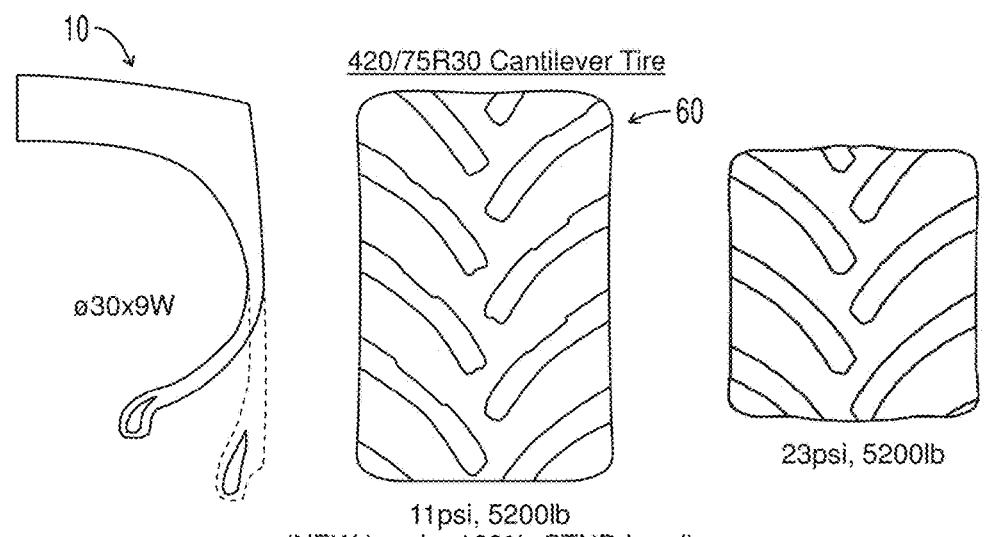
FIG. 7B shows a schematic cross-section view and footprints similar to FIG. 7A for an example of the low compaction cantilevered tire design of the present invention.

FIGS. 7A and 7B then contrast the footprints which would be achieved by the tire 10 of the present invention as depicted in FIG. 7B, as compared to a similar size tire of conventional construction as depicted in FIG. 7A.

Thus, FIG. 7A shows on the left hand side thereof a schematic representation of the cross-sectional shape of the conventional tire of size 420/85R26. The right hand figure depicts the footprint of the tire when inflated to an inflation pressure of 23 psi and loaded at the tire load limit of 5200 lb. Then, for purposes of comparison, the middle image of FIG. 7A shows the footprint that would be created by the conventional tire if its inflation pressure were reduced to 11 psi (the permitted inflation pressure of the tire of FIG. 7B) with it being understood that the conventional tire is not actually rated to be utilized at this load at such a low inflation pressure.

FIG. 7B then shows in the leftmost image thereof a schematic representation of the cross-sectional shape of the tire 10 of the present invention, superimposed upon the cross-sectional shape of the conventional tire for comparison. The middle image of FIG. 7B then depicts the footprint of the tire 10 of the present invention at an inflation pressure of 11 psi and loaded to a tire load limit of 5200 lb. Then, by way of comparison, the right hand image of FIG. 7B depicts the footprint of the tire 10 of the present invention if inflated to 23 psi, just for comparison to the conventional tire of FIG. 7A. The 420/75R30 tire represented in FIG. 7B may be described as being rated for a load of at least about 5200 lb at a cold inflation pressure of 11 psi.

The footprint depictions of FIGS. 7A and 7B were created through numerical modeling of the tires. The finite element analysis was done using ABAQUS/STANDARD finite element analysis software. The model and process was as follows. The tread pattern and carcass are discretized. Elastic material properties are applied to the tread pattern and carcass. The tread pattern is attached to the carcass with tie constraints (numerical glue). Inflation forces are applied to the inside of the carcass. A load is applied to the rim surfaces. The resulting footprint area and contact pressures were analyzed.

That numerical modeling shows that the contact area of the footprint shown in the middle image of FIG. 7B for the tire 10 of the present invention when inflated to 11 psi has 14% greater contact area than is exhibited by the conventional tire in the middle image of FIG. 7A when it is inflated to 11 psi.

Thus, the tire design of the present invention utilizing a low compaction cantilevered tire feature will provide a tire construction capable of carrying heavier loads at lower inflation pressures than any of the previous STND, IF or VF tire ratings, and providing greater contact area for a given inflation pressure and loading than do any of those prior tire constructions.

The increased contact area for the tire 10 of the present invention as contrasted to a conventional tire is a result of the different deflection shapes achieved by the tires under load as was previously illustrated in the comparison of FIGS. 5A and 5B. The curvature of the carcass of the conventional tire as depicted in FIG. 5A is such that portions of the tire near the equatorial plane of the tire begin to lift off. This phenomenon is more fully illustrated in FIGS. 8-11.

Figure 8:
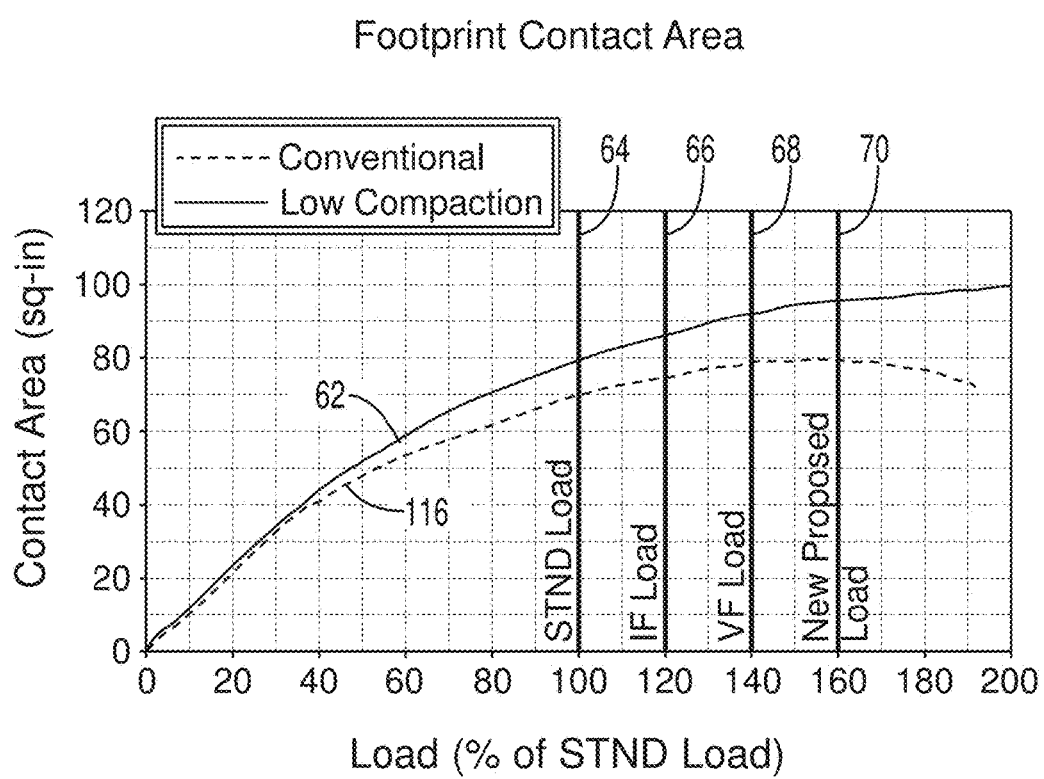
FIG. 8 is a graph showing contact area as a function of percent standard load, and comparing the low compaction tire of the present invention to a typical prior art tire.

Referring now to FIG. 8, a graphical presentation is thereshown of the contact area of both a conventional and a low compaction cantilevered tire construction as a function of the percentage of standard load. The contact area of the low compaction cantilevered tire 10 is illustrated by the curve 62. The contact area of the conventional tire construction 100 is illustrated by the curve 116. It is noted that the curve 116 peaks and begins to drop off which is due to the undesirable deflection of the tread area and the upper sidewall portion of the conventional tire which causes the conventional tire footprint to lift off in a center area 110 of the footprint.

Also indicated in FIG. 8 are several vertical load lines corresponding to different levels of loading of the tire. The vertical line 64 at 100% of standard load represents the STANDARD specified maximum load for the tire of the indicated size as specified by The Tire and Rim Association. The Tire and Rim Association also defines high flexure IF and VF agricultural load conditions which are roughly 120% and 140% of the standard load, respectively. The IF load condition is indicated by the vertical line 66 and the VF load condition is indicated by the vertical line 68.

Vertical line 70 represents a new load condition, as yet undefined by The Tire and Rim Association, and referred to herein as the New load condition, which the low compaction cantilevered tire construction 10 makes possible. This new load construction may be described as being in excess of a VF load rating in accordance with the standards of The Tire and Rim Association.

Side by side comparisons of the contact pressures of the conventional tire and the low compaction cantilevered tire design of the present invention are shown in FIGS. 9A-9B, 10A-10B and 11A-11B. The darker areas near the shoulders 112 and 114 have generally higher pressures than the lighter areas near the center area 110.

FIG. 9A depicts the contact pressures for the prior art tire design at an inflation pressure of 6 psi and a load of 2995 lb. FIG. 9B depicts the contact areas for the low compaction cantilevered tire 10 of the present invention at an inflation pressure of 6 psi and a load of 2995 lb.

FIG. 10A depicts the contact pressures for the prior art tire design at an inflation pressure of 6 psi and a load of 3744 lb. FIG. 10B depicts the contact areas for the low compaction cantilevered tire 10 of the present invention at an inflation pressure of 6 psi and a load of 3744 lb.

Figures 11A, 11B:
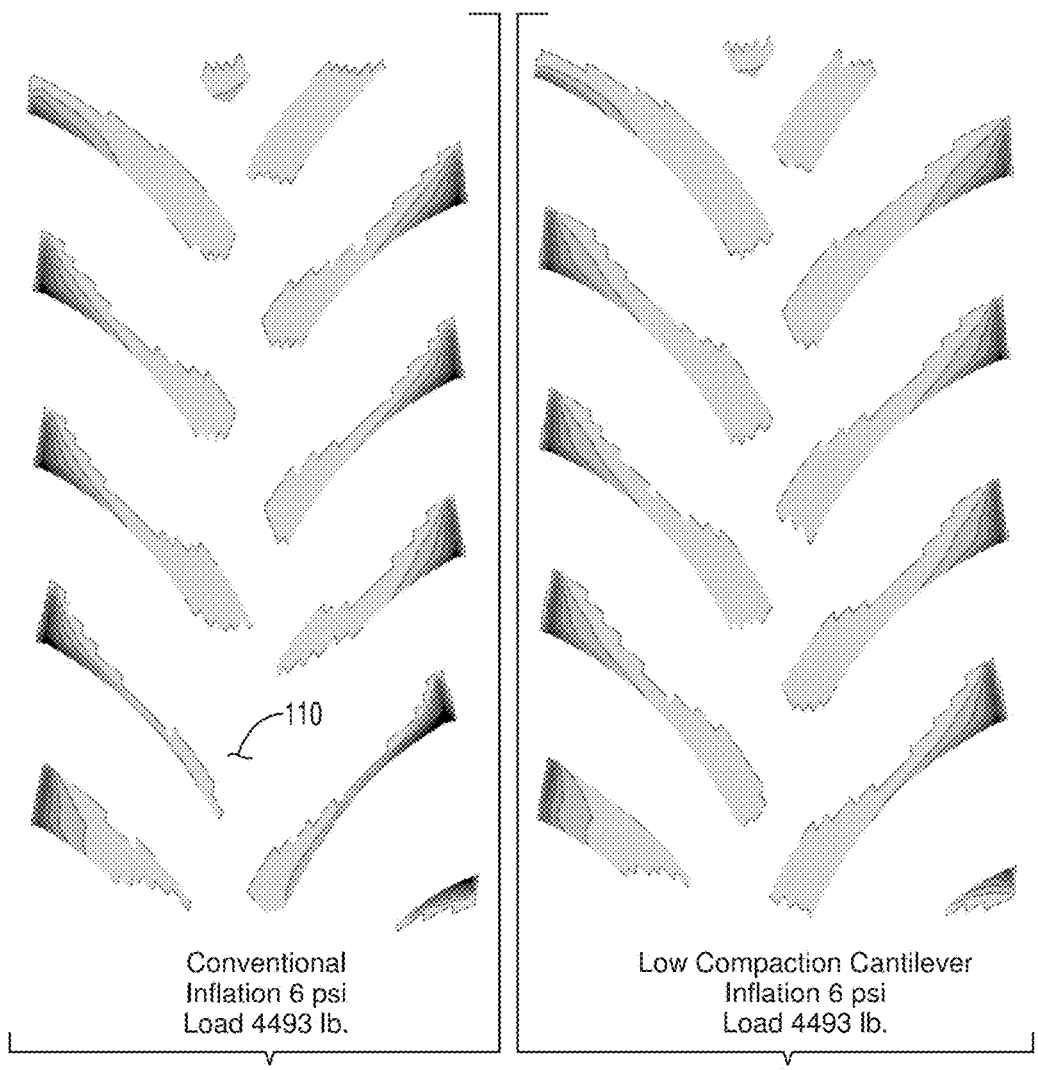
FIGS. 11A and 11B are a side by side comparison of the contact pressures for a prior art tire and an example tire of the present invention at a load of 4493 lbs.

FIG. 11A depicts the contact pressures for the prior art tire design at an inflation pressure of 6 psi and a load of 4493 lb. FIG. 11B depicts the contact areas for the low compaction cantilevered tire 10 of the present invention at an inflation pressure of 6 psi and a load of 4493 lb.

As is most clearly visible in the comparison of FIGS. 11A and 11B, the conventional tire shown on the left hand side has significant areas 110 near the equatorial plane of the tire having relatively low contact pressures.

In all of the FIGS. 9-11, the conventional tire being modeled is again the 420/85R26 and the low compaction cantilevered tire being modeled is a 420/75R30 constructed in accordance with the design of FIG. 1.

It is noted that any production tire will typically be marked with a rated inflation pressure. That marking represents an arbitrary standardized point selected by the manufacturer. But it is meaningful to describe a tire as having a maximum load at some specified inflation pressure, which may be the rated inflation pressure specified by the manufacturer for the tire. For example, the 420/75R30 tire described herein can be described as being rated for a load of at least about 5200 lb at a cold inflation pressure of 11 psi. Such a description does not require that the manufacturer mark the tire as having a rated inflation pressure of 11 psi.

It will be understood that when a tire is described herein as having a certain load rating, this is a reference to the load rating as specified by the appropriate standards setting association for tires of that size and construction, for example The Tire and Rim Association. It does not require that the tire actually be exactly so specified by its manufacturer, or that the rating markings on the tire be exactly as specified.

Multiple Field Mountings

Figure 12:
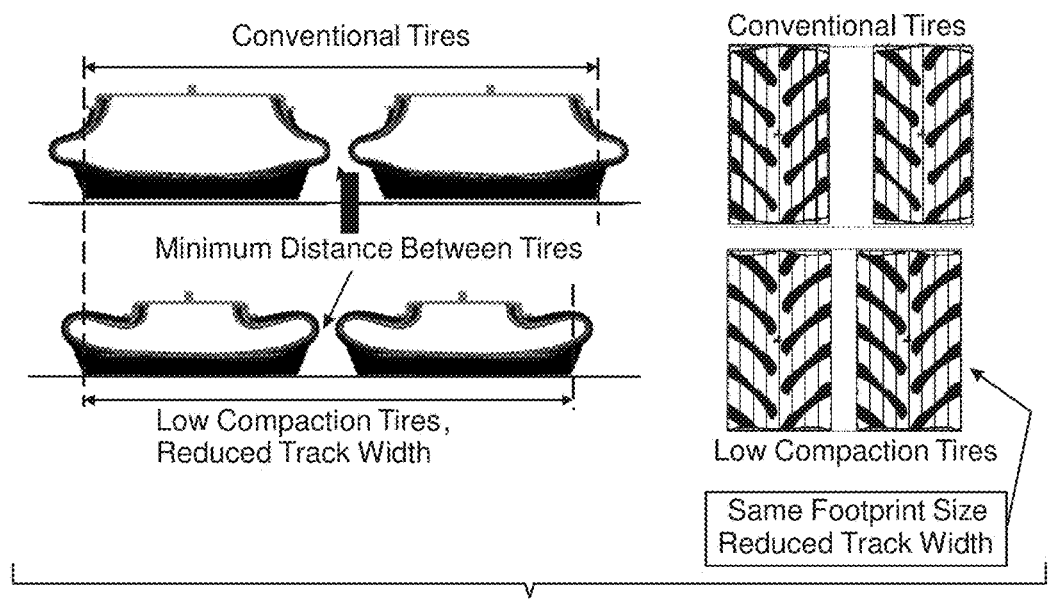
FIG. 12 in the upper portion thereof, shows a schematic cross-section view of two conventional tires mounted side by side in a dual mounting configuration, along with the corresponding footprint thereof shown to the right, and the lower portion of FIG. 12 shows the same features of a dual mounting of the tire construction of the present invention, illustrating the ability to provide the same footprint size with reduced track width.
Figure 13:
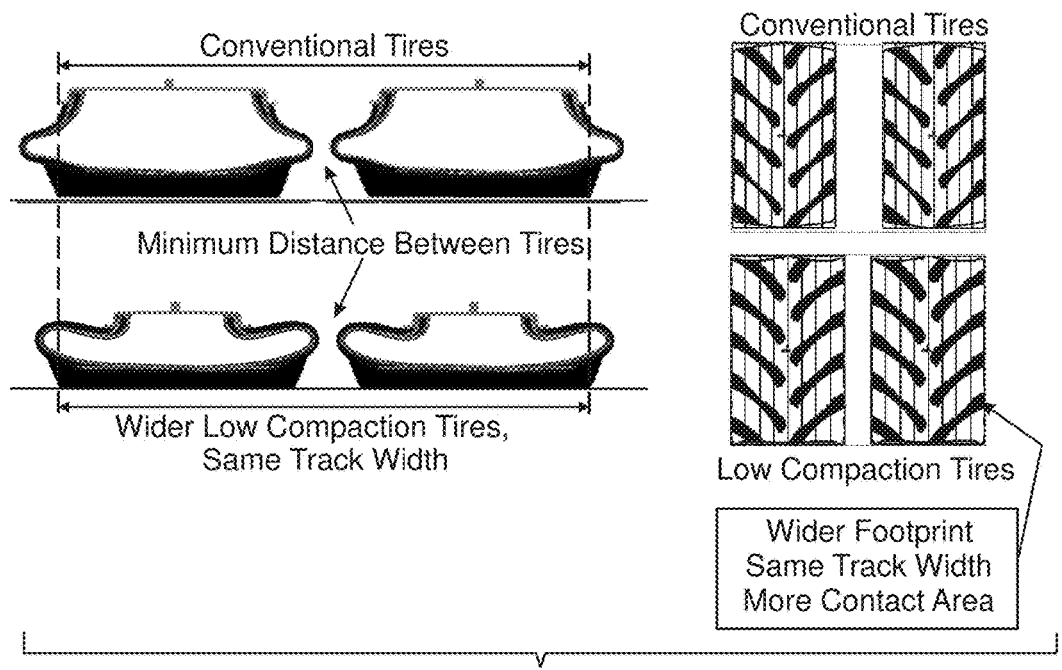
FIG. 13, in the upper portion thereof, shows a schematic cross-section view of two conventional tires mounted side by side in a dual mounting configuration, along with the corresponding footprint thereof shown to the right, and the lower portion of FIG. 13 shows the same features of a dual mounting of the tire construction of the present invention, showing a wider footprint in the same track width.

FIGS. 12 and 13 illustrate another advantage of the low compaction cantilevered tire construction, when that construction is utilized for the mounting of multiple tires such as a dual or triple tire application as is sometimes used on agricultural equipment and other heavy equipment. The relatively low lateral sidewall deflection of the low compaction cantilevered tire construction 10 allows multiple tires to be placed closer together in dual and triple applications without having the adjacent tires rub against each other when they are in a highly loaded condition. This capability allows the farmer or other equipment operator two possibilities for improved performance. The first option as illustrated in the lower portion of FIG. 12 is to bring the low compaction cantilevered tires closer together. This allows for a reduced track width as compared to a dual mounting of conventional tires of equivalent size.

The second option as illustrated in FIG. 13, is to keep the same track width of the dual tires, but to use wider low compaction cantilevered tires 10. This results in an increased contact area while maintaining the same overall track width for the dual tire construction.

Thus it is seen that the apparatus and methods of the present invention readily achieve the ends and advantages mentioned as well as those inherent therein. While certain preferred embodiments of the invention have been illustrated and described for purposes of the present disclosure, numerous changes in the arrangement and construction of parts and steps may be made by those skilled in the art, which changes are encompassed within the scope and spirit of the present invention as defined by the appended claims.

What is claimed is:

1. A pneumatic tire and rim assembly, comprising:
   a rim having rim flanges; and
   a tire including:
     a circumferential tread portion;
     a carcass including a pair of beads and one or more radial body plies extending between and wrapped around the beads;
     one or more belts disposed between the carcass and the circumferential tread portion; and
     a pair of sidewall portions extending from the beads to the tread portion, each of the sidewall portions including a lower cantilevered sidewall portion, at least an axially outer one-half of the lower cantilevered sidewall portion being free of any reinforcing layers other than the one or more radial body plies; and
   wherein the tire is mounted on the rim such that the lower cantilevered sidewall portions extend generally axially outward past the rim flanges, and the lower cantilevered sidewall portions are configured such that when the tire is operating in a pneumatic mode and remains inflated to an inflation pressure within a manufacturer recommended pressure range for a normal inflated running mode of the tire and when the tire is loaded at maximum rated load for the inflation pressure, the lower cantilevered sidewall portions each exhibit a radially inward axially outward slope, the tire not being a run flat tire; and
   wherein the tire is an agricultural drive tire and the circumferential tread comprises an agricultural tread including first and second rows of tread lugs extending from first and second shoulders of the tread portion toward an equatorial plane of the tire, the lugs extending at an angle of from 0° to 50° to a rotational axis of the tire, the tread having a ratio of contact area to total tread area of less than 50%.

2. The tire and rim assembly of claim 1, wherein:
   when the tire is in an unloaded condition, the lower cantilevered sidewall portions exhibit a radially outward axially outward slope.

3. The tire and rim assembly of claim 1, wherein:
   the tire has a tire section width; and
   the rim has a rim width in a range of from 30% to 70% of the tire section width.

4. The tire and rim assembly of claim 1, wherein:
   when the tire is inflated to the inflation pressure and when the tire is loaded at the maximum rated load for the inflation pressure, the carcass maintains a positive curvature throughout an upper portion of each sidewall portion extending down to 40% or less of a section height of the tire.

5. The tire and rim assembly of claim 4, wherein:
   the body plies of the carcass terminate in turn-up ends; and
   the carcass maintains the positive curvature at least down to a highest one of the turn-up ends.

6. The tire and rim assembly of claim 1, wherein:
each of the sidewall portions is free of any reinforcing layers other than the one or more radial body plies up to at least 60% of a section height of the tire.

7. The tire and rim assembly of claim 1, wherein:
each of the sidewall portions is free of any reinforcing layers other than the one or more radial body plies up to at least 70% of a section height of the tire.

8. The tire and rim assembly of claim 1, wherein:
the body plies of the carcass terminate in turn-up ends; and
the side wall portions have a substantially uniform bending resistance from a highest one of the turn-up ends upward to at least 60% of a section height of the tire.

9. The tire and rim assembly of claim 8, wherein:
the side wall portions have a substantially uniform bending resistance from a highest one of the turn-up ends upward to at least 70% of the section height of the tire.

10. The tire and rim assembly of claim 1, wherein:
the tire is a size 420/75R30, and is rated for a load of at least about 5200 lb at a cold inflation pressure of 11 psi.

11. The tire and rim assembly of claim 1, wherein the tire has a load rating in excess of a VF load rating in accordance with the standards of The Tire and Rim Association.

\* \* \* \* \*